US006910047B1

(12) United States Patent
Boucher et al.

(10) Patent No.: US 6,910,047 B1
(45) Date of Patent: Jun. 21, 2005

(54) METHOD AND SYSTEM FOR CHANGING RATING DATA VIA INTERNET OR MODEM IN A CARRIER MANAGEMENT SYSTEM

(75) Inventors: Glen Boucher, Ansonia, CT (US); Terri A. Carroll, Milford, CT (US); Jacques E. Hasbani, Bethel, CT (US); Kenneth Karbowski, Farmington, CT (US); Edward M. Rauh, West Haven, CT (US)

(73) Assignee: Pitney Bowes Inc., Stamford, CT (US)

( * ) Notice: Subject to any disclaimer, the term of this patent is extended or adjusted under 35 U.S.C. 154(b) by 949 days.

(21) Appl. No.: 08/942,264

(22) Filed: Oct. 1, 1997

(51) Int. Cl.[7] .............................................. G06F 17/30
(52) U.S. Cl. ............................ 707/103; 707/3; 707/10; 707/102; 707/104; 709/107; 709/205; 709/310; 717/177
(58) Field of Search .............................. 707/3, 10, 102, 707/103, 104; 709/107, 205, 310; 717/177; 705/402, 34; 395/200.33

(56) References Cited

U.S. PATENT DOCUMENTS

| 4,122,532 A | 10/1978 | Dlugos et al. ............... 705/409 |
| 4,138,735 A | 2/1979 | Allocca et al. .............. 705/409 |
| 4,249,241 A | 2/1981 | Aberle et al. ............... 710/200 |
| 4,320,461 A | 3/1982 | Dlugos ....................... 705/410 |

(Continued)

FOREIGN PATENT DOCUMENTS

| EP | 0304072 A2 | 2/1989 |
| EP | 0336552 AZ | 10/1989 |
| EP | 0623876 A2 | 11/1994 |

(Continued)

OTHER PUBLICATIONS

Griss, Martin L. et al. "Building object–oriented instrument kits," Object Magazine, Apr. 1996, pp71–81.

Kostas "ISDN Overview," Telephone Engineer & Management, V 88, P 153 Dec. 1, 1984.

Egan: "Costing and Pricing for an Integrated Digital Telecommunications Network," Telecommunications, v 21 n 11, Nov. 1987, pp 47–54. Abstract Only.

(Continued)

*Primary Examiner*—Thuy N. Pardo
(74) *Attorney, Agent, or Firm*—Brian A. Lemm; Angelo N. Chaclas (57) ABSTRACT

The invention is a method and system of updating a set of data objects within a Data Access System (DAS). The method begins by initiating a communication link between a client and a host data processing system. Once a communications link is established, a set of object tables is uploaded from the client data processing system to the host. The object tables are read at the host; and, a determination is made as to which data objects in the set of object tables are to be updated. It is also determined which data objects in the set of object tables is to be simply maintained. A new set of object tables is then constructed at the host data processing system and transmitted to the client data processing system. Upon receipt of the new file tables, the client system performs the task of verifying accurate receipt of the new set of object tables prior to restarting the client data processing system. The verification step includes saving at the host, a first data map of the new set of object tables as a record of which objects were transmitted. The new set of object tables is then received and saved within a memory of the client data processing system before retransmitting the new set of object tables as a second data map back to the host from the client. The second data map is then compared with the first data map to form a comparison, and if the first data map and the second data map do not match, then the verification is nulled.

7 Claims, 7 Drawing Sheets

U.S. PATENT DOCUMENTS

| | | | |
|---|---|---|---|
| 4,528,644 A | | 7/1985 | Soderberg et al. .......... 705/410 |
| 4,736,687 A | | 4/1988 | Grube et al. ............. 104/88.04 |
| 4,901,237 A | | 2/1990 | Hikita et al. ................ 705/414 |
| 4,999,806 A | | 3/1991 | Chernow et al. ........... 717/177 |
| 5,014,193 A | | 5/1991 | Garner et al. ................. 710/10 |
| 5,040,132 A | | 8/1991 | Schuricht et al. ........... 715/507 |
| 5,072,397 A | | 12/1991 | Barns-Slavin et al. ...... 705/402 |
| 5,077,660 A | | 12/1991 | Haines et al. ............... 705/410 |
| 5,107,455 A | | 4/1992 | Haines et al. .................. 710/8 |
| 5,193,180 A | | 3/1993 | Hastings ..................... 717/163 |
| 5,247,683 A | | 9/1993 | Holmes et al. ............. 709/221 |
| 5,261,080 A | | 11/1993 | Khoyi et al. .................. 710/65 |
| 5,287,270 A | | 2/1994 | Hardy et al. .................. 705/34 |
| 5,293,310 A | | 3/1994 | Carroll et al. .............. 364/408 |
| 5,303,379 A | | 4/1994 | Khoyi et al. ................ 717/166 |
| 5,325,290 A | | 6/1994 | Cauffman et al. ............ 705/34 |
| 5,337,246 A | | 8/1994 | Carroll et al. ......... 364/464.02 |
| 5,367,671 A | | 11/1994 | Feigenbaum et al. .......... 707/1 |
| 5,369,401 A | | 11/1994 | Haines ....................... 705/403 |
| 5,369,778 A | * | 11/1994 | San Soucie et al. .... 707/103 R |
| 5,421,009 A | | 5/1995 | Platt ............................ 709/221 |
| 5,421,015 A | * | 5/1995 | Khoyi et al. ................ 709/107 |
| 5,444,630 A | * | 8/1995 | Dlugos ....................... 705/402 |
| 5,446,896 A | | 8/1995 | Hegarty et al. ................. 707/1 |
| 5,473,630 A | | 12/1995 | Penzias et al. ......... 379/114.02 |
| 5,485,369 A | | 1/1996 | Nicholls et al. ............. 364/401 |
| 5,515,425 A | | 5/1996 | Penzias et al. ......... 379/114.02 |
| 5,546,577 A | * | 8/1996 | Marlin et al. ............... 707/103 |
| 5,548,756 A | | 8/1996 | Tantry et al. .................. 707/10 |
| 5,550,976 A | | 8/1996 | Henderson et al. ......... 709/201 |
| 5,555,416 A | | 9/1996 | Owens et al. ............... 717/178 |
| 5,581,463 A | | 12/1996 | Constant et al. ............ 705/400 |
| 5,604,906 A | | 2/1997 | Murphy et al. ............. 717/162 |
| 5,612,884 A | | 3/1997 | Haines ....................... 705/403 |
| 5,631,827 A | | 5/1997 | Nicholls et al. ............ 395/228 |
| 5,666,493 A | | 9/1997 | Wojcik et al. ................ 705/26 |
| 5,666,501 A | | 9/1997 | Jones et al. ................. 715/748 |
| 5,680,615 A | * | 10/1997 | Marlin et al. ............... 707/103 |
| 5,729,457 A | | 3/1998 | Seymour ................. 455/456.5 |
| 5,748,980 A | | 5/1998 | Lipe et al. ...................... 710/8 |
| 5,752,027 A | | 5/1998 | Familiar ..................... 707/103 |
| 5,758,154 A | | 5/1998 | Qureshi ......................... 713/1 |
| 5,758,329 A | | 5/1998 | Wojcik et al. ................ 705/28 |
| 5,764,977 A | * | 6/1998 | Oulid-Aissa et al. ......... 707/10 |
| 5,771,381 A | | 6/1998 | Jones et al. ................. 713/100 |
| 5,778,348 A | | 7/1998 | Manduley et al. .......... 705/409 |
| 5,778,377 A | * | 7/1998 | Marlin et al. ............... 707/103 |
| 5,787,246 A | | 7/1998 | Lichtman et al. ........... 709/220 |
| 5,809,329 A | | 9/1998 | Lichtman et al. .............. 710/8 |
| 5,812,991 A | | 9/1998 | Kara ........................... 705/410 |
| 5,832,218 A | * | 11/1998 | Gibbs et al. ............ 395/200.33 |
| 5,835,777 A | | 11/1998 | Staelin ........................ 717/175 |
| 5,845,090 A | | 12/1998 | Collins, III et al. ......... 709/221 |
| 5,852,813 A | | 12/1998 | Guenther et al. ............ 705/408 |
| 5,857,197 A | * | 1/1999 | Mullins ....................... 707/103 |
| 5,860,012 A | | 1/1999 | Luu ............................ 717/175 |
| 5,881,236 A | | 3/1999 | Dickey ........................ 709/221 |
| 5,899,998 A | * | 5/1999 | McGauley et al. .......... 707/104 |
| 5,909,575 A | | 6/1999 | Perry .......................... 713/100 |
| 5,909,581 A | | 6/1999 | Park ............................ 717/170 |
| 5,933,647 A | | 8/1999 | Aronberg et al. ............ 717/178 |
| 5,956,505 A | | 9/1999 | Manduley ....................... 713/1 |
| 5,963,743 A | | 10/1999 | Amberg et al. .............. 717/174 |
| 6,012,065 A | | 1/2000 | Boucher et al. ............. 707/103 |
| 6,018,725 A | | 1/2000 | Boucher et al. ............. 705/401 |
| 6,047,267 A | * | 4/2000 | Owens et al. .................. 705/34 |
| 6,078,889 A | | 6/2000 | Boucher et al. ................ 705/1 |
| 6,163,813 A | | 12/2000 | Jenney ........................ 719/315 |
| 6,182,117 B1 | * | 1/2001 | Christie et al. .............. 709/205 |
| 6,301,707 B1 | | 10/2001 | Carroll et al. ............... 717/177 |
| 6,425,016 B1 | * | 7/2002 | Banavar et al. .............. 709/310 |
| 2002/0065827 A1 | * | 5/2002 | Christie et al. ................ 707/10 |

FOREIGN PATENT DOCUMENTS

| | | |
|---|---|---|
| EP | 0713177 A1 | 5/1996 |
| EP | 0841615 A2 | 9/1997 |
| GB | 2331601 A | 5/1999 |
| JP | 55-142216 | 11/1980 |
| JP | 59-034121 | 2/1984 |
| JP | 07-260881 | 10/1995 |
| JP | 010191232 | 7/1998 |
| WO | WO 91/02313 A1 | 8/1989 |
| WO | WO94/11817 | 5/1994 |
| WO | WO95/01598 | 1/1995 |
| WO | WO96/08765 | 3/1996 |
| WO | WO98/33106 | 7/1998 |

OTHER PUBLICATIONS

"ZD Net Launched On Microsoft Network," Newsbytes News Network, Aug. 25, 1995.

Bausch, Dan O. and Brown, Gerard G.; "Dispatching shipments at minimal cost with multiple mode alternatives," Journal of Business Logistics, Mar. 1, 1994.

Andel, Tom; "Rating/Routing Software: Make Special Deliveries Routine;" Transportation and Distribution, Nov. 1, 1996.

Prince, Tyler and Kaufman, Scott; "From Order To Loading Dock," Information Week, Nov. 14, 1995.

Object–Oriented Modeling and Design, Prentice Hall, Schenectedy, New York.

* cited by examiner

METHOD AND SYSTEM FOR CHANGING RATING DATA VIA INTERNET OR MODEM IN A CARRIER MANAGEMENT SYSTEM

RELATED APPLICATIONS

Reference is made to application Ser. No. 08/942,265, now U.S. Pat. No. 6,301,707, entitled INSTALLING SOFTWARE BASED ON A PROFILE, assigned to the assignee of this application.

Reference is made to application Ser. No. 08/942,209, now abandoned, entitled CARRIER MANAGER INTERFACE UTILIZING AN OCX CONTROL, assigned to the assignee of this application.

FIELD OF THE INVENTION

The present invention relates generally to computer systems, and more particularly relates to automatically selecting and importing information from a network resource, and formatting the information for use by a local processing resource.

Reference is made to application Ser. No. 08/942,263, now U.S. Pat. No. 6,012,065, entitled A METHOD AND SYSTEM FOR ACCESSING CARRIER DATA, assigned to the assignee of this application.

Reference is made to application Ser. No. 08/942,262, now U.S. Pat. No. 6,078,889, entitled A METHOD AND SYSTEM OF IMPLEMENTING A CARRIER MANAGER LIBRARIAN, assigned to the assignee of this application.

Reference is made to application Ser. No. 08/942,260, now U.S. Pat. No. 6,018,725, entitled A METHOD AND SYSTEM OF IMPLEMENTING A CARRIER MANAGER REGISTRY, assigned to the assignee of this application.

Reference is made to application Ser. No. 08/942,261, entitled EVENT INTERFACE FOR A CARRIER MANAGER SYSTEM, assigned to the assignee of this application.

BACKGROUND OF THE INVENTION

The related, commonly assigned, applications cited hereinabove, as well as the present application, are directed toward methods and systems for efficiently handling logistics applications. More particularly, the present application is directed toward a method and system for rating charges to be applied to parcels, letters, or similar items to be transported by a carrier as selected from among a set of carriers.

The ability of shippers to get parcels from the loading dock to the final destination in shorter time spans and at less cost has increased in recent years. The growth of the overnight carriers, and the consistency of the two and three day delivery carriers has created vast fleets of transport vehicles representing each of the many transportation modes. These, in turn, benefit from efficient manifesting and logistical accounting.

Carriers are companies that provide services to their clients for facilitating the transport of letters, parcels, bulk goods, or anything that can be shipped by public, common, or specialized transport means. There is a great variety in the types and scope of services that can be provided by the individual carrier.

The growth of shipping demand has fueled the drive for efficiencies that each of the carriers has been developing. Technological advances and better methods of doing business have in turn spurred greater demand for carrier services. The net result is that the volume of parcels being shipped has continued to spiral upward.

Systems and methods have been proposed to more efficiently handle the increased volume of parcels and the proliferation of carrier services that are available. Carriers have introduced systems and methods that are targeted to that carrier only. Shippers have looked for systems that provide them with a means to rate or service shop. The object of all of these systems has been to get a parcel on from point A to point B, efficiently.

Carrier Management Systems such as that described in U.S. Pat. No. 5,040,132, SYSTEM FOR PREPARING SHIPPING DOCUMENTS, issued Aug. 13, 1991 to Schuricht et al., are well known to the art. One such system is the E900 Carrier Management System, developed and marketed by the assignee of the present application. The E900 generally includes as peripheral elements: a microprocessor, keyboard; monitor; platform scale; printer, and possibly a scanner. The E900 system automatically prepares documents for shipping articles to any desired number of different receivers by any selected carrier or mode.

The ability of carriers to respond to shipper needs is based on the carrier's capacity. Carrier capacity is the space that is available at any given time in the vehicle representing the carrier's mode of transport. For every shipment that leaves the dock of a shipper bound for a particular destination, a carrier makes available a mode of transportation. Each mode of transportation has its unique vehicle for transport: freight cars via rail; containers via ship; cubic inches via truck; etc. This capacity must be rated in some manner according to the rating data developed and promulgated by each of the carriers.

Each carrier has its own rate structure for service charges. Typically, rate structures are complex and involve a variety of factors; these factors may include: distance from origin to destination; weight rating; dimensional rating; service rating; and mode of transport. Thus, the business rules for rating items to be transported varies greatly from carrier to carrier. Rating calculations may shift over time depending upon shifts in the business or carrier climate. Accordingly, it is desirable to provide a mechanism for updating how carrier rates are calculated.

The efficiency of rating techniques has been enhanced by methods such as is taught in U.S. Pat. No. 5,293,310 for a FLEXIBLE METHOD FOR APPLYING CUSTOMIZED RATING ADJUSTMENTS TO TRANSACTION CHARGES, issued Mar. 8, 1994 to Carroll et al. and assigned to the assignee of the present claimed invention. Carroll et al. discloses a method for automatically applying customized rating adjustments to transaction charges. Charges are determined by partitioning a class of transactions into cells in accordance with pre-determined criteria, determining base rates for the resulting cells, and applying customized rates to certain cells before transmitting the combined rate data to a shipping system data center. U.S. Pat. No. 5,337,246 for a FLEXIBLE APPARATUS AND METHOD FOR APPLYING CUSTOMIZED RATING ADJUSTMENTS TO TRANSACTION CHARGES, issued Aug. 9, 1994 to Carroll et al. discloses an alternative method of automatically applying customized rating adjustments to transaction charges.

The prior art works well in embedded systems or in an intranet environment where the systems administrator or systems user has some measure of control over the operating system platforms that are storing data, applying rating charges, and storing the data within a data center. However, the advancement of data processing systems and the ability of varying logistics services applications to require data sharing for the purposes of optimizing logistics operations has created a definitive need for systems of varying architecture, and with varying operating systems, to be able to share data within a common environment. Thus, there is a need for a logistics/shipping system capable of managing diverse applications within a common environment for optimal service. Additionally, a method of employing the rating functionality of one application within the functionality of another application is required.

As the capabilities of data processing systems has grown, so too have the requirements that are tasked to these systems. Greater speed has given rise to more detail oriented applications, greater memory capability has made memory intensive applications more attractive, and detailed applications have lead to more widespread use of previously inaccessible data processing abilities. With the spiraling growth in data processing ability, there has grown a need for more efficient ways of programming that promote speed as well as flexibility. Flexibility, in particular, allows applications that have been designed in varied programming languages, or operating on different platforms to be able to communicate without extensive system or file modification.

Once such means of promoting flexibility within a data processing system is in the use of "object-oriented" design (OOD). Object oriented programming languages are useful in removing some of the restrictions that have hampered application design due to the inflexibility of traditional programming languages.

OOD utilizes a basic element or construct known as the "object," which combines both a data structure and an intended behavior characteristic within the single element. Thus, software applications become an organized collection of discrete objects in which data is held or moved based on the intended behavior of an object which is inherently unique. Each object knows how to perform some activity. Objects can be specific or conceptual. But, to be of value to a particular application, objects must be able to be referenced.

Referencing is accomplished through indexing, addressing, or through value assignment which can be placed in a table for use as required. Objects can also be arranged by classification. Classification is based on groupings of objects based upon properties or characteristics important to an application or requirement. Each class describes a potentially infinite set of objects that comprise that class.

OOD is known in the software arts and specific discussion of application design based upon OOD is not required for a thorough understanding of the applicant's claimed invention. The use of object oriented design, together with the use of an OCX to facilitate object oriented linking of diverse applications, is a distinct benefit when employed within data processing systems such as logistics systems with rating applications. Therefore, it is an object of the present invention to provide for an object oriented method and system, of communication via the globally accessible computer network known as the InterNet. The Internet is a vast resource of information, much of which is available at no direct cost. A local computer can connect to a distant server, request a file or an image from the server, and receive the requested information immediately without a direct charge for the value of the information.

One popular technology enjoying wide use with the Internet is known as the World Wide Web. The World Wide Web enables a computer to locate a remote server using a server name in an agreed-upon format that is indexed at a central Domain Name Server (DNS); the computer can then establish a connection to the server and retrieve information using a communication protocol called the Hypertext Transfer Protocol (HTTP). A Uniform Resource Locator (URL) uniquely identifies each page of information stored on the remote server. A URL is a form of network address that identifies the location of information stored in a network. The local computer requests information by providing a request containing a URL of the desired information to the remote server. The pages of information are files prepared in the Hypertext Markup Language (HTML).

For all these reasons, there is a need for methods, apparatus and products that can request and retrieve information from a remote source; format the information for local use; and pass the formatted information for local use. There is also a need for such methods, apparatus and products that can retrieve such information in an automatic way, and automatically format the information for use by a local processing resource.

SUMMARY OF THE INVENTION

The present claimed invention is a method and system of updating a set of data objects within a Data Access System (DAS). The method begins by initiating a communication link, through a modem or similar communication link, between a client data processing system and a host data processing system.

Once a communications link is established, a set of object tables is uploaded from the client data processing system to the host data processing system. The object tables are read at the host data processing system; and, a determination is made as to which data objects in the set of object tables are to be updated. It is also determined which data objects in the set of object tables is to be simply maintained. A new set of object tables is then constructed at the host data processing system and transmitted to the client data processing system.

Upon receipt of the new file tables, the client system performs the task of verifying accurate receipt of the new set of object tables prior to restarting the client data processing system. The verification step includes saving at the host data processing system, a first data map of the new set of object tables as a record of which objects were transmitted. The new set of object tables is then received and saved within a memory of the client data processing system before retransmitting the new set of object tables as a second data map back to the host data processing system from the client data processing system. The second data map is then compared with the first data map to form a comparison, and if the first data map and the second data map do not match, then the verification is nulled

DETAILED DESCRIPTION OF THE PREFERRED EMBODIMENTS

Figure 1:
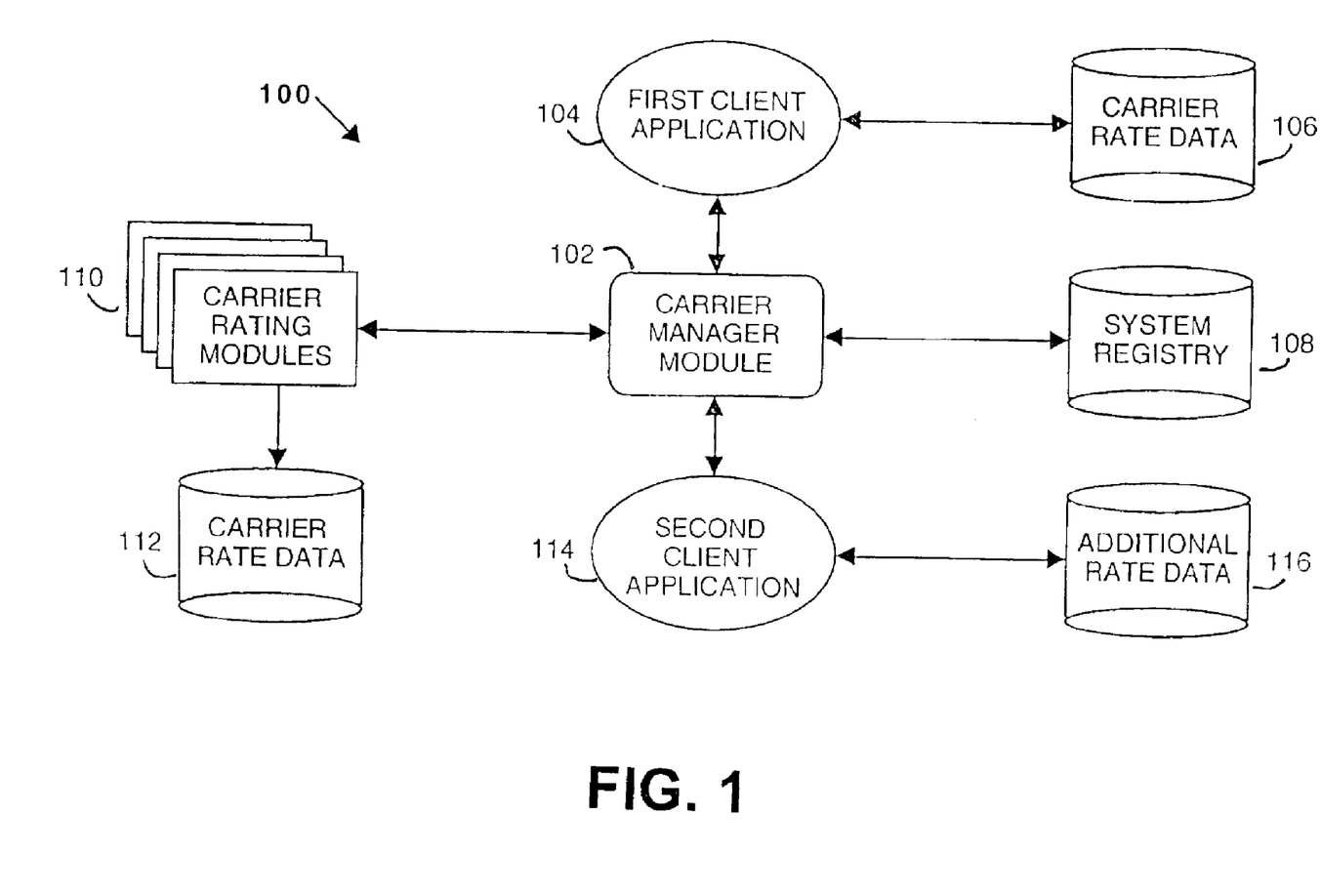
FIG. 1 is a block diagram of a typical logistics or shipping system as described within related applications as listed hereinabove.

Turning to FIG. 1 there is shown system 100 which is typical of logistics or shipping applications that can employ rating schemes to determine carrier charges based upon input from more than one input application.

The heart of the system is run-time loadable carrier manager module 102 which is comprised of a rating engine for performing at least some of the rating related tasks. Carrier manager module 100 interfaces with first client application 104 which is configured to perform various shipping related tasks. The carrier manager module is further configured to access entries in system registry 108.

System registry 108 is responsible for run-time loading one of a plurality of carrier rate modules 110 as well as for registering all modules available to the carrier manager module 100. The carrier rating modules 110 are loaded into the executable space of first client application 104, thereby avoiding the use of resource intensive inter-process communication (IPC) mechanisms (IPC mechanisms would include "named pipes," etc.).

Each carrier rating module 110 includes program instructions to access carrier rate data 112 and rate items using business rules encapsulated therein together with rate data associated with a particular carrier. After loading a carrier rating module 110, the carrier manager module 102 provides an entry point in the carrier rate module 110 to the first client application 104. In this manner, first client application 104 can invoke the instructions in the carrier rate module 110 to rate an item (such as a particular parcel or a particular service) for the carrier associated with the selected rate module 110. Additionally, first client application 104 includes prior carrier rating routines of its own for rating items based on carrier rate data 106.

Carrier manager module 102 can also be loaded by a second client application 114, together with its additional rate data 116, for utilizing the carrier rating functionality of the carrier rating modules 110 as is described hereinabove in connection with the first client application 104. Thus, the isolated carrier rating modules 110, under control of carrier manager module 102 are arranged to provide carrier rating functionality for a plurality of client applications 104, 114, or possible others, as may be required by the system user or designer.

In some system configurations, the revision level of the first client application 104 may be such that they were developed prior to the design of the system architecture described herein. For example, first client application 104 may be a shipping application for rating parcels shipped by express carriers. When the carrier manager system 100 architecture is designed, it would be a relatively uncomplicated task to upgrade first client application 104 to access carrier management module 102 for the carrier rating functions in the new carrier rating modules 110. In the instant example, new carrier rate modules 110 may contain Less Than Truckload (LTL) rating routines for shipping items by truck. Thus, to add trucking functionality to first client application 104's legacy of functions, it is a relatively straightforward process to call the new carrier management module 102 to load the carrier rate modules 110 applicable to LTL rating activities.

First client application 104 still includes the prior carrier rating routines of its own for rating items based on carrier rate data 106 for carriers not supported by carrier rating modules 110. In the example, the shipping application still contains routines for rating parcels for supported carriers; however, it is difficult to extract the carrier rating routines from first client application 104 for creating a new carrier rating module 110. Systems that rely upon legacy data tend to break down if large scale modifications are made thereto because the data becomes incompatible with the new application that seeks to employ it. Replacing carrier rating routines within a new carrier manager architecture could lead at least to compatibility problems, or at worst to system breakdown.

Keeping the carrier rating routines in the first client application 104, instead of in the carrier rating modules 110, means that rating functionality for those carriers is not available to second client application 114. In the example, second client application 114 may be a load planning application. In the configuration shown in FIG. 1, load planning application (in this case second client application 114) only has access to the LTL rating routines of carrier rating modules 110 and not to the rating routines embedded in the legacy shipping application (in this case first client application 104). Thus, it is desirable to make the carrier rating functionality of first client application 104 available to second client application 114 without having to make extensive modifications to first client application 104. First client application 104, however, may be implemented in a programming language or operating system environment in which it very difficult (i.e. task intensive) to receive requests directly from second client application 114 for the purposes of rating.

Figure 2:
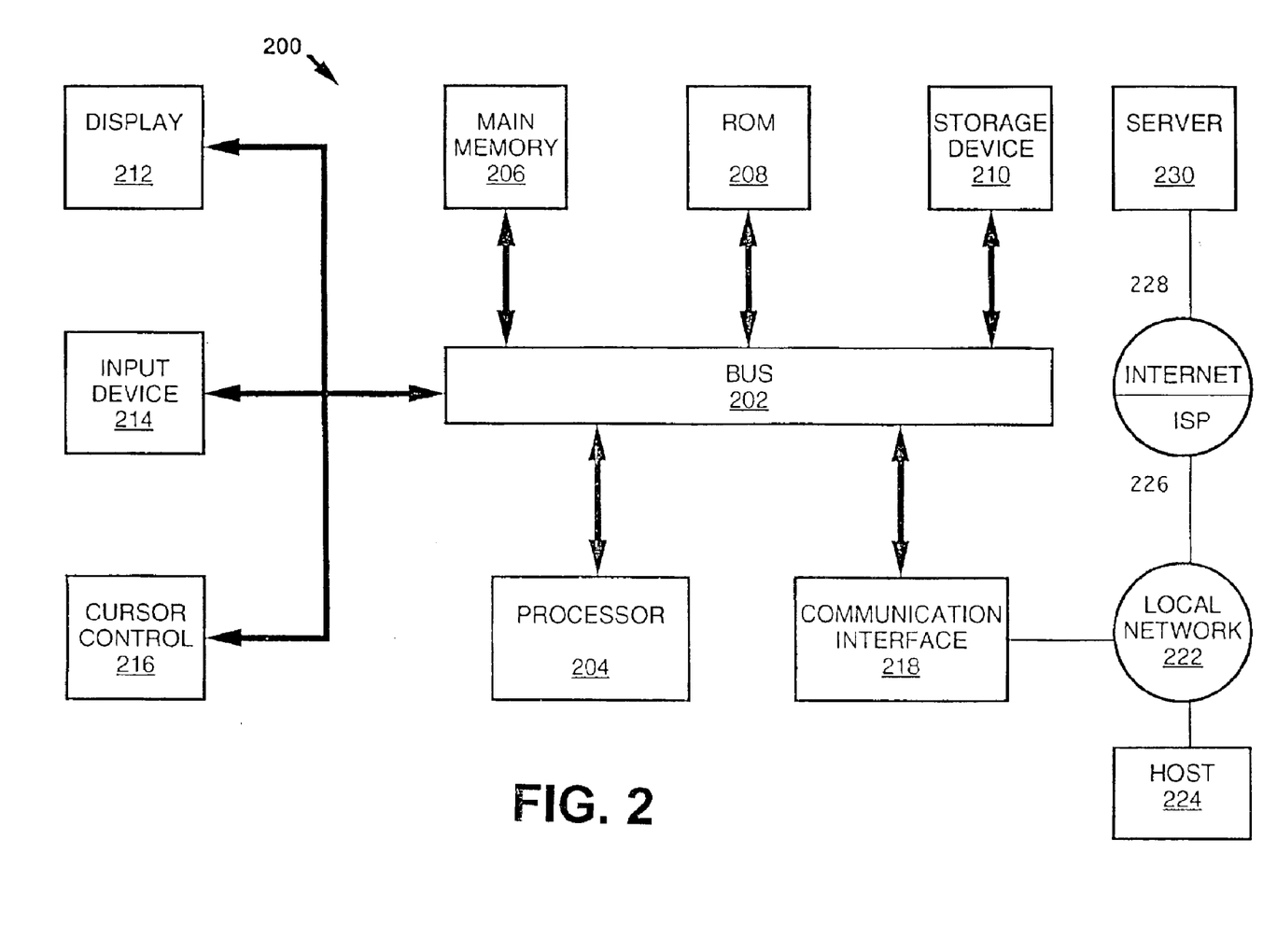
FIG. 2 is block diagram of a data processing system which is of an architecture that is suitable for implementing the claimed invention.

A method of employing the rating functionality of one application within the functionality of another is shown in FIG. 2.

Turning to FIG. 2, there is shown a block diagram of data processing system 200 which is of an architecture that is suitable for implementing the claimed invention.

Data processing system 200 comprises bus 202, or a similar communications means, for communicating information, and a processor 204 operatively coupled with bus 202 for processing data. Data processing system 200 also includes a main memory 206, such as a random access memory (RAM) or other dynamic storage device, coupled to bus 202 for storing data and instructions to be executed by processor 204. Main memory 206 also may be used for storing temporary variables or other immediate data during execution of instructions by processor 204. Data processing system 200 further comprises a read only memory (ROM) 208 or other static storage device coupled to bus 202 for storing static data and instructions for processor 204. Storage device 210, such as a magnetic disk or optical disk, is provided and coupled to bus 202 for storing data and instructions. Common examples of data processing system 200 may include: personal computers (PCs); work stations, minicomputers; servers; mainframes; and certain LANs or WANs.

Data processing system 200 may be coupled via bus 202 to a display 212, such as a cathode ray tube (CRT), for displaying information to a system user. An input device 214 such as a keyboard, including alphanumeric and/or other keys, is coupled to bus 202 for communicating information and command selections to processor 204. Another type of user input device is cursor control 216, such as a mouse or trackball, or cursor direction keys for communicating direction information and command selections to processor 204 and for controlling cursor movement on display 212.

According to one embodiment of the invention, rating items for carriers is provided by data processing system 200 in response to processor 204 executing one or more sequences of one or more instructions contained in main memory 206. Such instructions may be read into main memory 206 from another computer readable medium, such as storage device 210. Execution of the sequences of instructions contained in main memory 206 causes processor 204 to perform the process steps described herein. One or more processors in a multi-processing arrangement may also be employed to execute the sequences of instructions contained in memory 206. In alternative embodiments, hard-wired circuitry may be used in place of, or in combination with, software instructions to implement the invention. Thus, embodiments of the invention are not limited to any specific combination of hardware circuitry and software.

The data processing system 200 may be operated by a user, for example, sitting at a desk with a keyboard as an input device 214, a mouse as a cursor device 216, and a monitor as a display device 212. The user types commands through the keyboard or "clicks" with the mouse on icons displayed on the monitor to execute instructions that cause the data processing system 200 to rate an item. The results of the item rating may be displayed to the user on the monitor or saved to a file in storage device 210 for use by other programs (i.e. an application for printing a bill of lading, printing permits, or applying postage).

The term "computer readable medium" as used herein refers to any medium that participates in providing instructions to processor 204 for execution. Such a medium may take many forms, including but not limited to: non-volatile media such as optical or magnetic disks; volatile media such as dynamic memory; and/or transmission media such as coaxial cables, copper wire, or fiber optic cable. Transmission media can also take the form of acoustic or light waves, such as those generated during radio frequency (RF) and infrared (IR) data communications. Common forms of computer readable media include: a floppy disk; a flexible disk; hard disk; magnetic tape; CD-ROM; DVD; or any medium form from which a computer can read.

Various forms of computer readable media may be involved in carrying one or more sequences of one or more instructions to processor 204 for execution. For example, the instructions may initially be borne on a magnetic disk of a remote computer. The remote computer can load the instructions into its dynamic memory and send the instructions over a telephone line using a modem. A second modem, resident at data processing system 200, can receive the instructions on the telephone line and use an infrared transmitter to convert the data into an infrared signal. An infrared detector coupled to bus 202 can receive the data carried in the infrared signal and place the data on bus 202 for further transport. Bus 202 carries the data to main memory 206, from which processor 204 retrieves and executes the instructions. The instructions received by main memory 206 may optionally be stored on storage device 210 either before or after execution by processor 204.

Data processing system 200 also includes a communication device 218 coupled to bus 202. Communication interface 218 provides a two-way data communication coupling to a network link 220 that is connected to a local network 222. For example, communication interface 218 may be an integrated services digital network (ISDN) card or a modem to provide a data communications connection to a corresponding type of telephone line. As another example, communication interface 218 may be a local area network (LAN) card to provide a data communications connection to a compatible LAN. Wireless links may also be implemented. In any such implementation, communication interface 218 sends and receives electrical, electromagnetic, or optical signals that carry digital data streams representing various types of information.

Network link 220 typically provides data communications through one or more networks to other data devices. For example, network link 220 may provide a connection through local network 222 to a host computer 224 or to data equipment operated by an Internet Service Provider (ISP) 226. ISP 226, in turn, provides data communication services through the world-wide packet data communication network, commonly referred to as the "Internet" 228. Local network 222 and Internet 228 both use electrical, electromagnetic, or optical signals that carry digital data streams. The signals through the various networks and the signals on network link 220 and through communication interface 218, which carry the digital data to and from data processing system 200, are exemplary forms of carrier waves transporting the information.

Data processing system 200 can send messages and receive data, including program code, through the network(s), network link 220, and communication interface 218. In the Internet example, a server 230 might transmit a requested code for an application program through Internet 228, ISP 226, local network 222, and communication interface 218. In accordance with the invention, one such downloaded application provides for rating items for carriers.

The received code may be executed by processor 204 as it is received, and/or stored in storage device 210, or other non-volatile storage for later execution. In this manner, data processing system 200 may obtain application code in the form of a carrier wave.

The Data Access System

Figure 3:
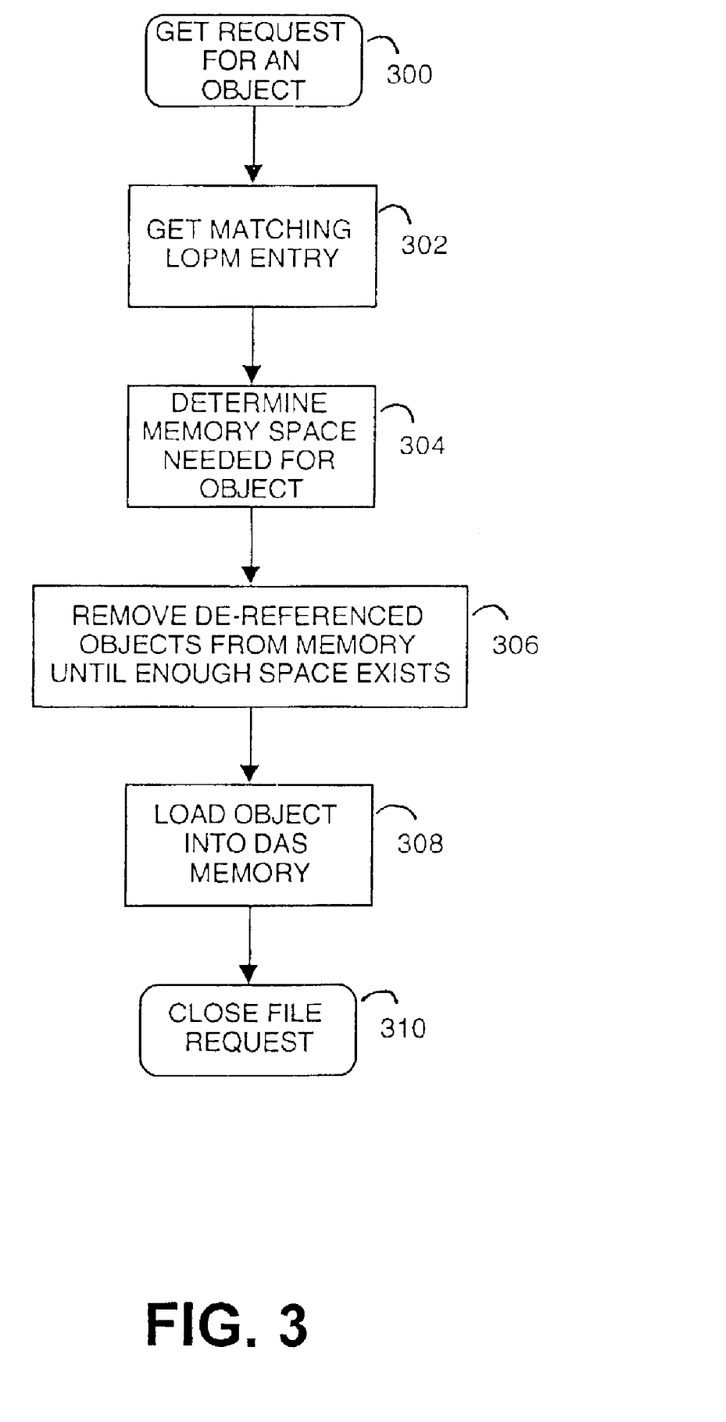
FIG. 3 is an upper level flowchart of the method of utilizing the Data Access System (DAS) within a carrier manager system.

Turning to FIG. 3, there is shown an upper level flowchart of a Data Access System (DAS) which can be employed with a carrier management system. The purpose of the DAS, which gets a request for an object at step 300, is to provide the carrier manager components with access to carrier data for the purposes of either rating or structuring a transaction. Alternatively, step 300 could refer to the initialization of the DAS which occurs only when the DAS is first started up by an application. The DAS performs the data provision in a fast and efficient manner by combining memory management and behavior change techniques that adapt to the system user's historical preference patterns.

From step 300, the method advances to step 302 where a match is performed between the entry from the LOPM and the newly obtained object. If a match is determined, then at step 304, the memory space needed to store the new object is calculated. When it is determined that an object is to be added to the system memory, then, at step 306, the system removes de-referenced objects from the memory, based upon a determination of what available objects are the least frequently used (referenced) and least recently referenced. This determination helps in minimizing the memory footprint of the DAS. The system removes de-referenced objects until enough space exists within the pre-established memory threshold of the DAS to be able to load the new object at step 308. The method then advances to step 310 where the file request is closed.

Establishment and Framework of the DAS

Generally, DAS data consists of a collection of files containing various sets of carrier data. The data is divided into "Logical Object" segments, each of which contains some discrete element of data. These Logical Objects contain information such as: the carrier's description; data relating to a specific carrier service (such as "UPS Ground"); or, data relating to a specific special service (such as "C.O.D." or "Insurance"). Sub-objects and segments of objects can be accessed as well. A "sub-object" is a variation of the DAS object which consists of two standard DAS objects. The first object is an index table where the sub-object points to segments in the second object. If a sub-object is requested, then it is looked up in the first object (the index table) and the entry is used as the address to get an object segment. The segment is loaded into memory using the same steps as steps 300–310 described herein.

A segment of an object can be requested if an entire object is not needed. If only a segment is required, then the segment is loaded into memory using steps 300 through 310.

Many other kinds of data can also be stored in a single Logical Object. These Logical Objects are given a "name" to be referred to; these names are referred to as the "Logical Object Name" or LON.

A physical file on a personal computer (PC), or any larger computer (mini-computer, mid-frame, main frame, etc.), can contain any number of Logical Objects and their LONs are listed in a header portion of the file that they are a part of. Access to these files, and the Logical Objects that they contain is controlled, by a pair of tables called the Logical Object to Physical File Map (LOPM) and the Full Path Map (FPM). The LOPM is a list of the names of Logical Objects (LONs) and a reference number of the file that they are contained in. The FPM is a list of physical files that correspond to the reference numbers in the LOPM.

To access a Logical Object, a call is made to the DAS to make a request for the Logical Object (using its LON name). The DAS searches the LOPM table to find the LON and retrieves its file reference number. The DAS uses this reference number to search the FPM table in order to find the physical file containing the data object. When the physical file has been found, DAS opens the file, accesses the named data object, and loads it into a section of memory referred to as the "DAS heap." The DAS finally passes the "pointer" (target identifier) to this data (which is now in memory) to the calling entity who can then use the memory pointer to directly access the data. This mechanism relieves the caller from having to perform file I/O (file search and save) and having to allocate and release memory to store the data.

DAS Object Files and Object Management DAS provides management of Logical Objects, which are contained in a well-defined set of DAS managed files, and that conform to a generic file format, regardless of the format of data contained in each object. The location and retrieval of objects from the set of DAS managed files is controlled by two standard files the File ID—Full Path Map and the Logical Object to Physical File Map.

1. The File ID—Full Path Map

This file describes the set of files that make up the DAS managed object space. It contains one fixed length entry per DAS Object file in the system. The order of occurrence of file name records in the File ID—Full Path Map corresponds to the 1-indexed FileID reference value in the Logical Object to Physical File Map file.

The BNF of the structure for the File ID—Full Path Map is as follows:

```
FieldID-FullPathMap=
    { FullPathNameOfFile      char[64]
    + FilePermanenceValue     integer4} (1..Number of Entries)
```

This file is not a DAS managed file, and does not adhere to the standard DAS Object File format. It is loaded into an ObjectBuffer named fileMap during DAS initialization, and is used to translate FileID entries contained in the LOPM into actual operating system dependant file names.

2. The Logical Object to Physical File Map

The Logical Object to Physical File Map is the core of the DAS Object reference system. This file is used to translate the names of Logical Objects into FileIDs and locations within files of specific objects. The file is kept in sort order by Logical Object Name to facilitate binary searching. The Logical Object to Physical File Map is loaded into an object buffer, the LOPM during DAS initialization. The file is structured as follows:

```
LogicalObjectToPhysicalFileMap =
    { LogicalObjectName       char[20]
    + FileID                  integer4
    + ObjectPermanence        integer4
    + ObjectOffset            integer4
    + ObjectLength            integer4
    + ObjectAssociatedData    char[16] } (1..NumberOfObjects)
```

This file is not a DAS managed file, and does not adhere to the standard DAS Object File format.

3. DAS Object Files

A DAS Object File is a set of Logical Objects, whose names and characteristics are described in the header of the DAS Object File. Logical Objects are variable length data items of various types, which are interpreted by the Carrier Manager processes that traverse them. DAS is not aware of the structure or content of Logical Objects.

For each Logical Object in a DAS Object File, there is a directory entry in the DAS Object file header that identifies the Logical Object, and that describes the object's location, length, relative date permanence, and a free-form data field that further qualifies the identity of the object.

The BNF for a generic DAS Object File would be:

```
DASObjectFile =
    DASFileSignature         char[8]:="*DASFILE"
    + NumberOfObjectsInFile  integer2
    + {LogicalObjectName     char[20]
    + ObjectPermanence       integer4
    + ObjectOffset           integer4
    + ObjectLength           integer4
    + ObjectAssociatedData   char[16] } (1ÖNumberOfObjectsInFile]
    + { DASObject            varchar}(1..NumberOfObjectsInFile)
```

4. BTO, Update, and Recovery Issues

The Logical Object to Physical File Map and file ID—Full Path Map are constructed initially by the BTO process. As new objects are added to the system and old objects are removed, these tables are updated by the DAS Support Tool family. It is the responsibility of the DAS Support Tool family to (1) maintain the Header portion of all DAS Objects Files when additions and deletions occur, (2) maintain the Logical Object to Physical File Map simultaneously with the maintenance of the DAS Object File headers, (3) add and delete DAS Object Files in the File ID—Full Path Map, and (4) reconstruct the Logical Object to Physical File Map from the information in the File ID—Full Path Map and the headers of the referenced DAS Object Files. This maintenance is performed only when Runtime Carrier manager is not operating.

A mechanism for reconstructing the File ID—Full Path Map has not bee designed in detail at this time. A general approach to reconstructing the File ID—Full Path Map would be to examine the header area of all files, assembling a list of those files that had a valid DAS Object File header. The list could then be used to construct a File ID—Full Path Map which would lack only File Permanence detail. In the absence of File Permanence detail, the File Permanence Detail could be set to a standard, default value. The principal hazard of this approach would be that a list constructed in this way might include entries for files that had been previously retired from active use.

Once the File ID—Full Path Map had been created, the Logical Object to Physical File Map could be reconstructed by examining the headers of all files in the File ID—Full Path Map and extracting the lists of Logical Objects contained within the files. Once all file headers have been processed, the lists could be concatenated and sorted by Logical Object Name to form the Logical Object to Physical File Map.

5. LOPM Directory Services

The Logical Object to Physical File Map is maintained in sort order by logical Object Name in order to facilitate binary searching of the LOPM. As a result, the LOPM can be searched rapidly and once a location is established in the LOPM, the concepts of next and previous entry are supported by the LOPM's ordered structure.

It may be necessary to extract the directory entries of several similarly-named Logical Objects in order to determine which of them is the specific Logical Object desired by a process. A separate DAS function is provided that will extract the directory entries of all Logical Objects whose names match a partial Logical Object Name. The Carrier Manager function requesting the list of Logical Object Directory Entries could then choose among the Logical Objects selected based on information contained in the free-form data filed ObjectAssociatedData found in each entry.

6. Subobjects and AM Retrieval

There is at times a need for retrieving a portion of a Logical Object that contains smaller, discrete subobject entities as a single aggregate entity. An additional DAS function is needed to perform this operation. The mechanism to manage the retrieval and buffering of subobjects is as follows:

(1) A separate object, containing the index of subobjects for the aggregate Logical Object, is maintained, which contains a set of subobject keys, the subobject offset in the Logical Object, and the subobject length. As an example, an AM Table collection could be viewed as a single object, with an external index of Origins and Services. If the keys were maintained in sort order so that the index object were binary searchable, the Am Table Index Object could have the following structure:

```
IndexTableObject=
    IndexObjectSignature      char[9]="CHARINDEX"
    +LogicalObjectOfIndex     char[20]
    +NumberOfSubObjects       integer2
    +SizeOfIndexKey           integer2
    +{SubObjectKey            char[SizeOfIndexKey]
```

-continued

```
    +SubObjectOffset          integer4
    +SubObjectLength          integer4} (1..NumberOfSubObjects)
```

LTL Carriers need to have objects containing an allpoints map, with Origin charts addressed by 5 digit Zip Codes. Lists of these allpoints maps for AM use can have a very large number of entries, and holes for illegal Zip Codes can be ignored when constructing the index maps for the allpoints charts. The allpoints map could be represented in the form:

(LowerZipCode Bound, Upper ZipCode Bound, SubObjectOffset, SubObject Length)

If the range of ZipCodes is treated as continuous, the allpoints map can be represented with only an explicit lower bound in the form:

(Lower ZipCode bound, SubObject offset, SubObject Length)

with an implied upper bound of less than the next index entry. This allows for a 5 digit zipcode index object of the form:

```
5DigitIndexObject=
    IndexObjectSignature      char[9]="5DIGINDEX"
    +LogicalObjectOfIndex     char[20]
    +NumberOfSubObjects       integer2
    +{MinOriginKey            integer4
    +SubObjectOffset          integer4
    +SubObjectLength          integer4} (1..NumberOfSubObjects)
```

This structure would be searchable using the GenBinSrch( ) function defined in the Am Design Document, section 5 (General Binary Searching of Directory Entires).

(2) In order to retrieve a subobject, a separate DAS Function call would be made:

DASGetSubObject(IndexTableObjectLogicalName, SubObjectKeyString)

which would return a pointer to an object buffer. The index type would be established by examining the index signature at the beginning of the index object to determine what search mechanism would be used for the index. Subobjects would be registered in the AOBL with the name of the parent Logical Object, concatenated with the subobject's offset into the logical object. For example, if I wanted to retrieve the subobject for original 064, service 'GR', in the Logical Object UPSAMTABLE, which has an index UPSAMTABLEINDEX, I would issue a call in the form DASGetSubObject("UPSAMTABLEINDEX","064GR") and retrieve the table. If the subobject were at offset 0x1000 in the parent object, the subobject would be registered in the LOPM as "UPSAMTABLE.0x1000", so that later calls could retrieve it without having to redo the physical read of the subobject.

Though the detailed architecture of the DAS has been described in reference to FIG. 3 and hereinabove, the flow of the method to be employed within the DAS framework is shown beginning with FIG. 4A.

Figure 4A:
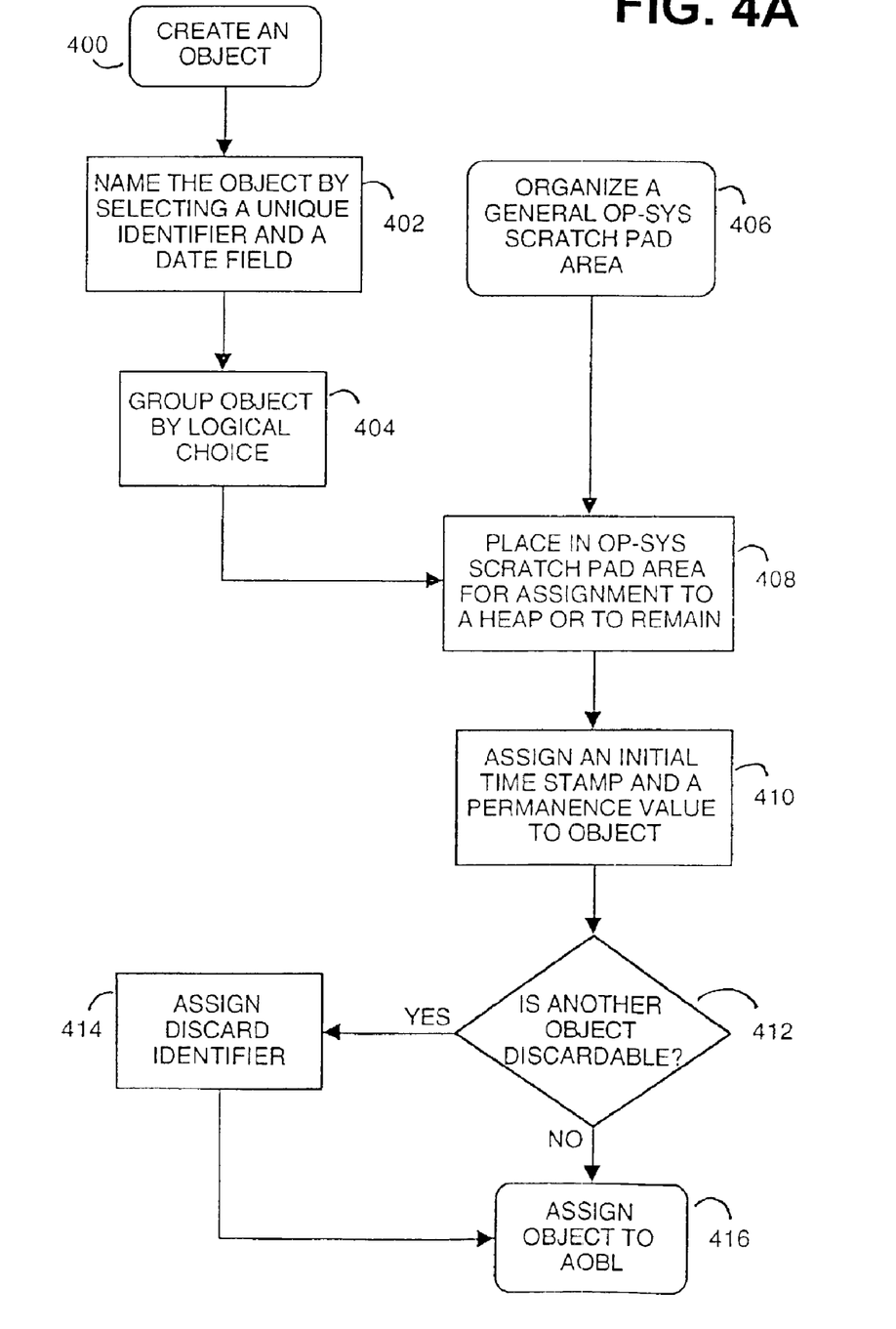
FIG. 4A is detailed flowchart of the method shown in FIG. 3.

Turning to FIG. 4A, there is shown a flowchart of the method flow within the DAS system. The method begins with the creation, at step 400, of an object to be stored. From creation of the object, the method advances to step 402 where the object is named with a unique identifier and a date field. The object naming mechanism is further discussed with respect to FIG. 5 hereinbelow.

Independently of the creation of the object, a general operating system scratch pad area is created, at step 406, as a function of the operating system. The scratch pad is used, at step 408, for moving data objects from file to file or to be stored while in transit.

Returning to step 402, the method advances to step 404 where created objects are grouped by logical choice (i.e., objects identified by common headers are placed within the same object table). The method advances from step 404 to step 408

After assignment of the object to the operating system scratch pad, the method assigns, at step 410, an initial time stamp and a permanence value to the object. Additionally, the method queries at step 412 as to whether or not the object is discardable or should be maintained within the LOPM. If the response to the query is "YES," then the method advances to step 414 where a discard identifier is assigned to the object before advancing to step 416 to assign the object to the AOBL. If, however, the response to the query at step 412 is "NO," then a discard identifier is not issued to the object and the method advances directly to step 416.

Figure 4B:
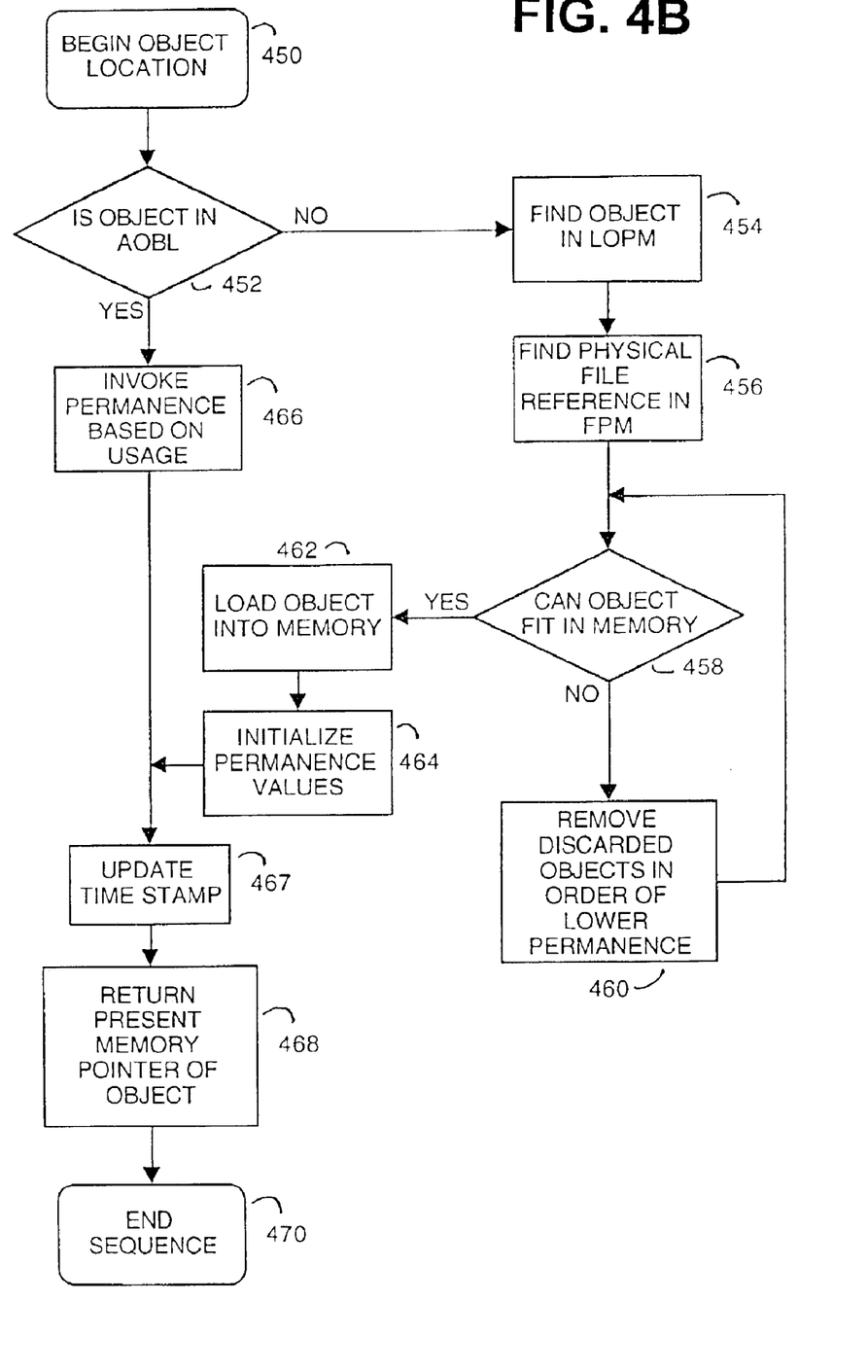
FIG. 4B is a continuation of the detailed flowchart of FIG. 4A.

Turning to FIG. 4B, there is shown a flowchart of the DAS method of operation with respect to the initiation of an application within the greater carrier management system. This flow begins with the location of the object at step 450. The object is found by its object name.

The method advances from step 450 to step 452 where the system queries as to whether or not the object can be located in the AOBL. If the response to the query is "YES," then the method advances to step 466 where permanence is invoked based upon the usage history of the particular object. The method advances from step 466 to step 467 where the object's time stamp is updated; the method then procedes to step 468 where the present memory pointer of the object is returned. From step 468, the method advances to step 470 and ends the object sequence.

If the response to the query at step 452 is "NO," then the method advances to step 454 where the method locates the object in the LOPM where an initial permanence value is assigned and the value of the object is constantly weighed. The method than advances to step 456 to find a physical file reference in the FPM. The method then causes the system to determine, at step 458, whether or not the object can fit into memory. If the response to the determination is "NO," then the system seeks to remove, at step 460, discarded objects in order of lower permanence. After removing discarded objects, the method returns to enter the method flow in front of the query at step 458.

If the response to the query at step 458 is "YES," then the method advances to step 462 where the object is loaded into memory and permanence values are initialized at step 464. The method flows from step 464 to enter the flow in front of step 468. At step 468, the present memory pointer of the object is returned and the method advances to step 470 where the sequence is ended.

Figure 5:
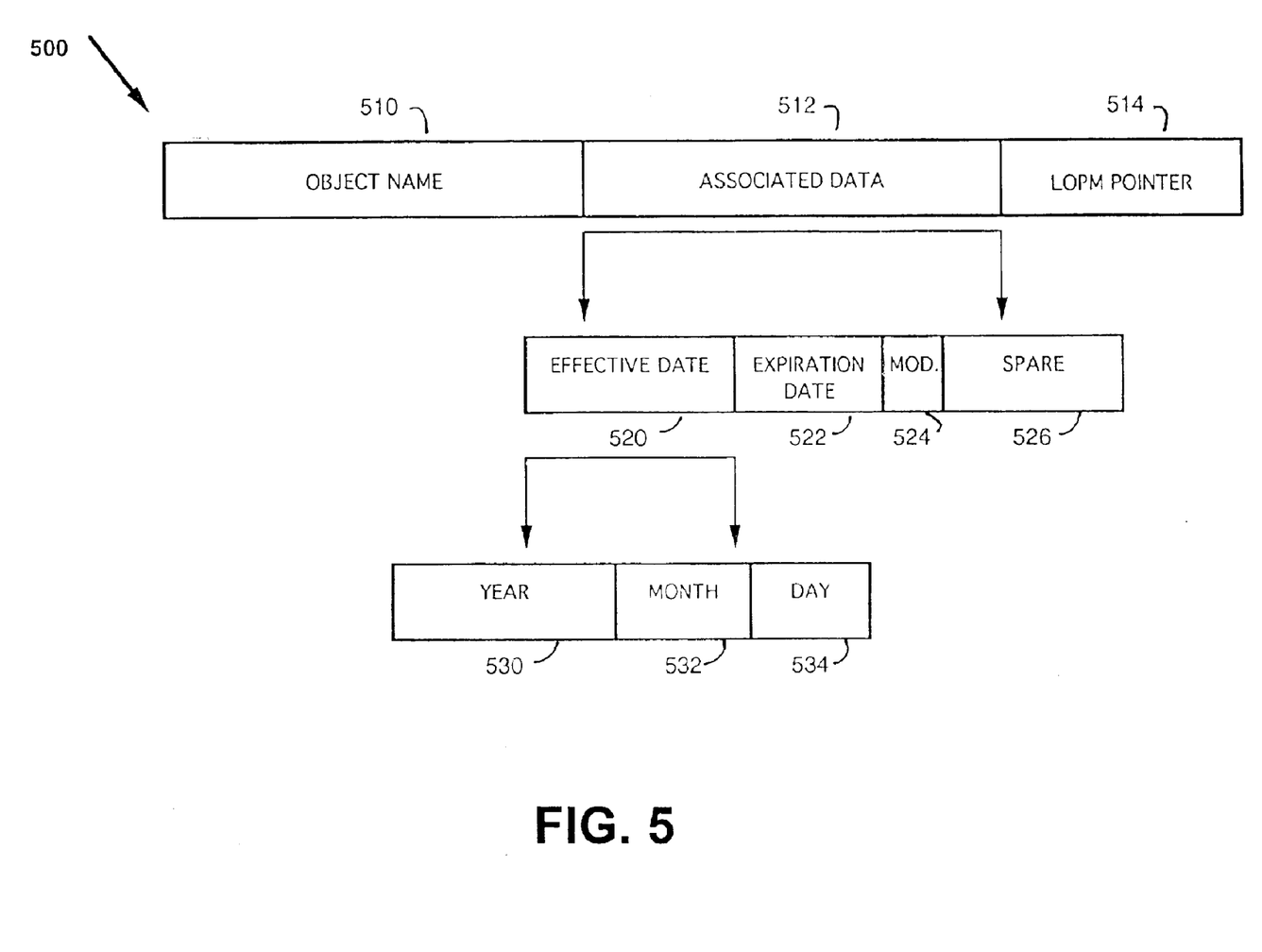
FIG. 5 is a block diagram of the identification convention for implementation changes utilized within objects of the Data Access System.

Turning to FIG. 5, there is shown a block diagram of the LOPM directory table for each Logical Object. Modifications to the DAS consist of changes to several of its components. First, the returned results from the function call "DAS_GetLOPM_Entry" return a pointer to a table 500 that consists of the DAS object names matching the input argument 510, the associated data of the named object 512, and a pointer 514 to the LOPM entry describing the named object.

The associated data 512 is further divided into fields describing the effective date 520, the expiration date 522, and the modification status 524 of the named object. The modification status byte 524 indicates the present state of the data object as the original, unmodified object (represented by "R"), a custom data object (represented by "C"), or as a dual data object (represented by "D"). Additional status codes can be defined on an "as required" basis. An additional data field 526 is available on a "spare field" basis. The date fields can be further described by the format YYYYMMDD in BCD. The format translates to year 530, month 532, and day 534 fields. The storage order makes it possible to perform a binary search of the fields.

Three additional DAS functions are required. These functions are: DAS_GuessObject; DAS_GuessSubObject; and DAS_GuessObject Segment. These functions are analagous to the three DAS functions that are used to get a data object by using an exact match to the object name. These functions operate on an Indefinite Logical Object Name (ILON) and parameters that make up a selection criteria on which to base the choice of an object.

For DAS_GuessObject and DAS_GuessSubObject, the input arguments are:

1. the ILON;
2. the Shipment Date; and
3. the desired Status Byte (which can be optional).

For DAS_GuessObjectSegment, the input arguments are:

1. the ILON;
2. the Object Offset;
3. the Object Length;
4. the Shipment Date; and
5. the desired Status Byte (which can be optional).

The ILON is a 14 byte name. The selection of the targeted logical object is made according to the following rules:

1. Based upon the 14 byte indefinite name, a list of matching objects is assembled (using the DAS_GetLOPM_Entry function call); and
2. The list is further reduced to a list of eligible logical objects by selecting objects that are effective and not yet expired (based upon the shipment date).

If a Status Byte is supplied as an argument, a pointer to the effective logical object with the matching Status Byte is returned. If no status argument is supplied, then a pointer to an original Logical Object is returned. The selection between several effective Logical Objects having the same status is controlled by the Instance Count portion of the Logical Name.

While this invention has been described in connection with what is presently considered to be the most practical and preferred embodiments, it is to be understood that the invention is not limited to the disclosed embodiment, but on the contrary, is intended to cover various modifications and equivalent arrangements included within the spirit and scope of the appended claims.

Figure 6:
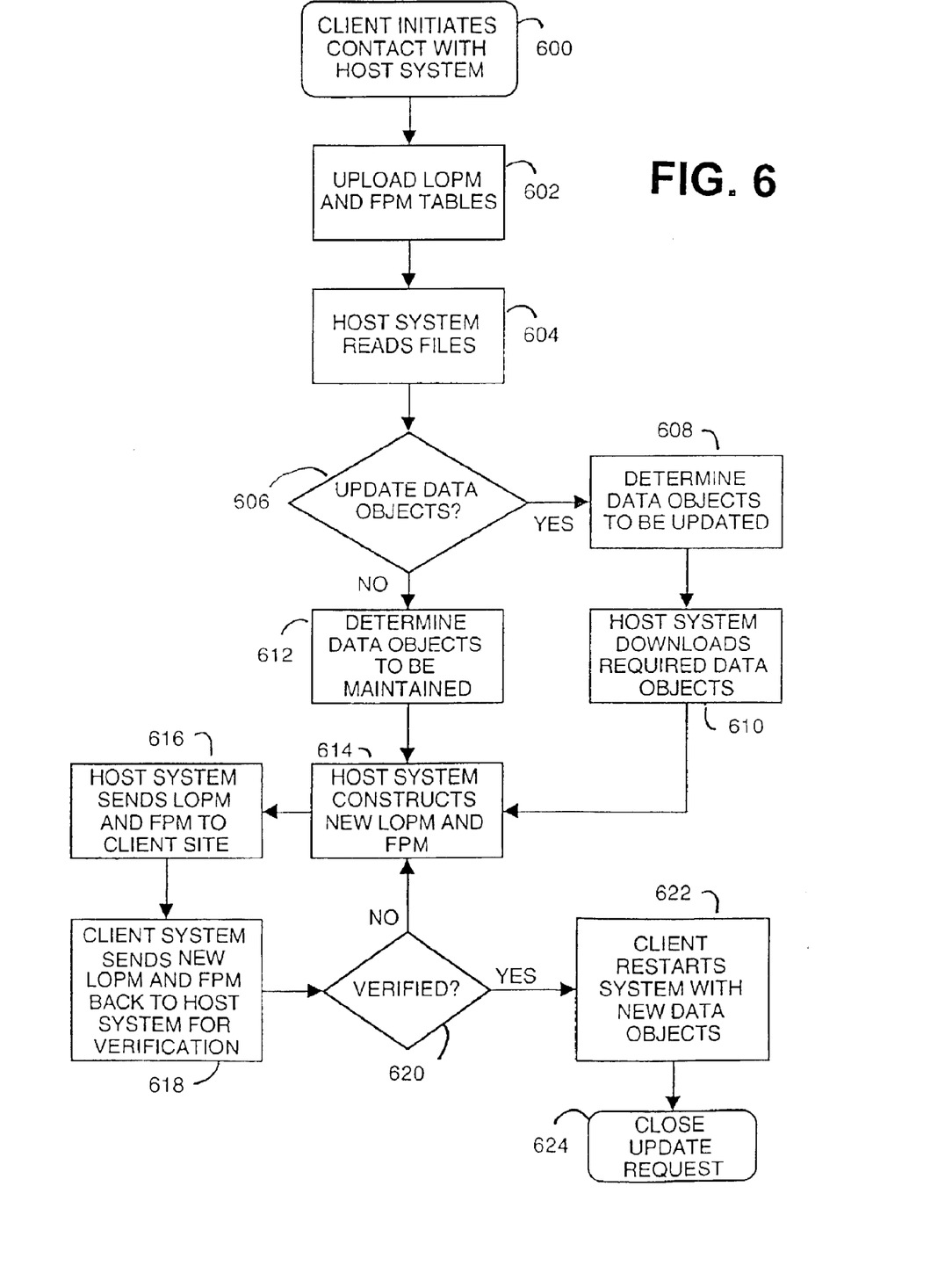
FIG. 6 is a flowchart of the method of updating data objects via a communication link such as a modem or Internet link.

Turning to FIG. 6, there is shown a flowchart of the method of updating data objects via a communication link such as a modem or Internet link.

The method flow begins at step 600 where the client system initiates contact with a host system. Initiation can be made via a simple hardwire connection, a modem connection, or could be made through access to the Internet or World Wide Web. Additionally, the client and host systems can be co-located From step 600, the method advances to step 602 where the object files, in the form of LOPM and FPM files, are uploaded from the client system to the host system. The host system reads, at step 604, the LOPM and FPM tables and determines whether or not certain of the data objects are to be updated or simply maintained.

The method determines, through a query at step 606, as to whether or not certain data objects are to be updated. If an update is required (i.e. the response to the query is "YES"), then the method advances to step 608 where it is determined which data objects are to be updated. The determination is accomplished by checking the expiration dates of the objects within the selected files. The host system, at step 610, then selects the required new data objects from its own memory and advances to step 614.

Returning to the query at step 606, if the response to the query is "NO," then the method advances to step 612 where it is determined which of the data objects are to be maintained. From step 612, the method advances to step 614.

At step 614, the host system constructs a new LOPM table and a new FPM table from the combined updated and maintained object files. The host system then transmits, at step 616, the new LOPM and FPM tables to the client system. At step 618, the client system performs a verification of the new tables by sending a copy of the received tables back to the host system for comparison and verification. The host system performs its part of the verification at step 620 by comparing a mapped copy of what it transmitted to the client system with a mapped copy of what the host received back from the client system. If the two maps match, then the host verifies the transmission by responding "YES" to the verification query and advancing to step 622; otherwise, the host returns to re-enter the method flow at step 614.

The client system, at step 622, accepts the downloaded new LOPM and FPM tables and restarts the system with the newly updated data objects before closing out the update request at step 624.

While this invention has been described in connection with what is presently considered to be the most practical and preferred embodiments, it is to be understood that the invention is not limited to the disclosed embodiment, but on the contrary, is intended to cover various modifications and equivalent arrangements included within the spirit and scope of the appended claims.

What is claimed is:

1. In a carrier management system comprising a client data processing system and a host data processing system, a method of updating a set of data objects within a Data Access System (DAS), comprising the steps of:

(a) initiating a communication link between said client data processing system and said host data processing system;

(b) uploading a set of object tables from said client data processing system to said host data processing system;

(c) reading said set of object tables at said host data processing system;

(d) determining which data objects in said set of object tables is to be updated and further determining which data objects in said set of object tables is to be maintained;

(e) constructing a new set of object tables, at said host data processing system;

(f) transmitting said new set of object tables from said host data processing system to said client data processing system;

(g) verifying accurate receipt of said new set of object tables at said client data processing system; and (h) restarting said client data processing system.

2. The method of claim 1, wherein said verification step further comprises the steps of:

(a) saving at said host data processing system, a first data map of said new set of object tables as a record of which objects were transmitted;

(b) receiving and saving said new set of object tables within a memory of said client data processing system;

(c) retransmitting said new set of object tables as a second data map back to said host data processing system from said client data processing system; and (d) comparing said second data map with said first data map to form a comparison, and if said first data map and said second data map do not match, then nullifying said verification.

3. The method of claim 1, wherein said communication link is initiated by requesting said link through a modem.

4. The method of claim 1, wherein said client data processing system and said host data processing system are each a node within a local area network comprising a plurality of nodes, wherein said each node of said local area network is linked to at least one other node within said local area network and data is exchanged between said each node and said at least one other node.

5. The method of claim 1, wherein said client data processing system and said host data processing system are each a node within a communication net and said communication link is activated within a set of protocols common to said communication net.

6. The Data Access System (DAS) of claim 1, wherein said DAS is co-located with said client data processing system.

7. The Data Access System (DAS) of claim 1, wherein said DAS is co-located with said host data processing system.

* * * * *